(12) United States Patent
Gherezghiher (10) Patent No.: US 10,906,603 B2
(45) Date of Patent: Feb. 2, 2021

(54) BICYCLE

(71) Applicant: GEREZ CYCLES LIMITED, London (GB)

(72) Inventor: Amanuel Gherezghiher, London (GB)

(73) Assignee: GEREZ CYCLES LIMITED, London (GB)

( * ) Notice: Subject to any disclaimer, the term of this patent is extended or adjusted under 35 U.S.C. 154(b) by 0 days.

(21) Appl. No.: 15/739,352

(22) PCT Filed: Jun. 27, 2016

(86) PCT No.: PCT/GB2016/051921
§ 371 (c)(1),
(2) Date: Dec. 22, 2017

(87) PCT Pub. No.: WO2016/207668
PCT Pub. Date: Dec. 29, 2016

(65) Prior Publication Data
US 2018/0162472 A1    Jun. 14, 2018

(30) Foreign Application Priority Data

Jun. 26, 2015   (GB) .................................. 1511303.8
Mar. 15, 2016   (GB) .................................. 1604406.7

(51) Int. Cl.
*B62J 6/00*   (2020.01)
*B62J 6/05*   (2020.01)
(Continued)

(52) U.S. Cl.
CPC . *B62J 6/05* (2020.02); *B62J 6/00* (2013.01); *B62J 6/015* (2020.02); *B62J 6/04* (2013.01);
(Continued)

(58) Field of Classification Search
CPC ..... B62J 6/00; B62J 6/001; B62J 6/003; B62J 6/04; B62J 6/06; B62J 6/16; B62J 6/20;
(Continued)

(56) References Cited

U.S. PATENT DOCUMENTS

| | | | | |
|---|---|---|---|---|
| 5,418,697 A | * | 5/1995 | Chiou | ..................... B62J 6/001 362/473 |
| 2004/0040407 A1 | * | 3/2004 | Chen | ......................... B62J 6/00 74/551.9 |

(Continued)

FOREIGN PATENT DOCUMENTS

| | | |
|---|---|---|
| CN | 102673686 A | 9/2012 |
| GB | 2464671 A | 4/2010 |
| WO | 2014205345 A2 | 12/2014 |

OTHER PUBLICATIONS

International Search Report & Written Opinion dated Nov. 10, 2016 from PCT Application No. PCT/GB2016/051921.

*Primary Examiner* — Y M. Quach Lee
(74) *Attorney, Agent, or Firm* — Innovation Capital Law Group, LLP; Vic Lin (57) ABSTRACT

The present invention relates to bicycles. More particularly, the present invention relates to an apparatus for increasing the visibility of a bicycle to other road users. According to a first aspect there is provided a bicycle comprising: one or more indicator lights; a handlebar portion and a frame portion; wherein the one or more indicator lights are integrated into the bicycle; and one or more integrated light projectors, wherein the one or more integrated light projectors comprise one or more lasers operable to generate one or more light projections on the surface on which the bicycle is being used.

17 Claims, 3 Drawing Sheets

(51) Int. Cl.
*B62J 6/04* (2020.01)
*B62J 6/06* (2006.01)
*B62J 6/20* (2006.01)
*B62K 19/40* (2006.01)
*B62K 21/12* (2006.01)
*B62J 6/015* (2020.01)
*B62J 6/16* (2020.01)
*B62J 45/00* (2020.01)

(52) U.S. Cl.
CPC .................. *B62J 6/06* (2013.01); *B62J 6/16* (2013.01); *B62J 6/20* (2013.01); *B62K 19/40* (2013.01); *B62K 21/12* (2013.01); *B62J 45/00* (2020.02)

(58) Field of Classification Search
CPC ...... B62J 21/42; B62J 2099/004; B62J 6/005; B62J 2099/002; B62J 2099/0026; B62K 19/40
See application file for complete search history.

(56) References Cited

U.S. PATENT DOCUMENTS

| | | | |
|---|---|---|---|
| 2004/0189722 A1* | 9/2004 | Acres | B62J 6/003 715/866 |
| 2009/0080207 A1* | 3/2009 | Hurwitz | B62J 6/00 362/464 |
| 2010/0283590 A1* | 11/2010 | Tee | B62J 6/00 340/432 |
| 2015/0085508 A1* | 3/2015 | McConathy | B62J 6/003 362/473 |
| 2015/0130944 A1* | 5/2015 | Hsu | B62J 99/00 348/148 |
| 2016/0001836 A1* | 1/2016 | Lee | B62J 6/003 362/475 |
| 2016/0330417 A1* | 11/2016 | Lin | B62J 6/00 |

* cited by examiner

BICYCLE

FIELD

The present invention relates to bicycles. More particularly, the present invention relates to an apparatus for increasing the visibility of a bicycle to other road users.

BACKGROUND

Riding a bicycle is a popular, low-emission form of transport. Cycling on public highways, in areas with poor lighting, or in busy urban areas alongside much heavier, faster and/or larger vehicles such as passenger and goods vehicles can be dangerous for cyclists due to the increased risk of a collision taking place. Collisions can occur when the cyclist or bicycle are not clearly visible to other road users.

Front and rear lights are conventionally attached to a bicycle when cycling at night or in other adverse conditions, but these provide limited visibility and are often lost or stolen.

SUMMARY OF INVENTION

Aspects and/or embodiments seek to provide a safer form of bicycle transport.

According to a first aspect there is provided a bicycle comprising: one or more indicator lights; and a handlebar portion and a frame portion; wherein the one or more indicator lights are integrated into the bicycle.

Optionally, the one or more indicator lights are integrated into the handlebar portion and/or the frame portion.

Optionally, the one or more indicator lights comprise a plurality of indicator lights.

When riding bicycles, arm signals are typically used by cyclists to indicate the direction in which they intend to travel. At night this presents a particular difficulty, as arm signals may not easily be seen by other road users. Further, these gestures are cumbersome, and require a degree of cycling proficiency as they require the cyclist to temporarily release their grip on the handlebars and momentarily cycle one-handed. Not all cyclists can, or are inclined to, perform this movement. This can result in accidents when other road users to not realise a cyclist is about to make a turn and so do not slow down or move out of the way appropriately.

Integrated indicator lights are provided in this aspect. As the indicators are integrated into the bicycle, the indicators should be more difficult to remove deliberately (for example by a thief) than a typical clip-on bicycle light that is fastened on to the handlebars. Further, integrating indicator lights can reduce the likelihood that the lights get broken, for example when a bike falls over or is bumped, depending on the location of the indicator light on the bicycle. Using an integrated indicator light can be easier for some riders than a hand gesture as such indicator lights would not require a user to remove a hand from the handlebars (which may reduce the ability of the user to control the bicycle) in order to operate the indicator lights (depending on the location of the controls). Indicator lights can also be more visible at night than an arm gesture, and so signal the intentions of a cyclist to another road user more clearly or at a far greater distance than would otherwise be possible using hand gestures, which can allow other road users more time to adjust their own vehicles accordingly.

In some embodiments, the indicator or indicator lights can be positioned at any point or points on the handlebars.

Optionally, the bicycle further comprises one or more front lights wherein the one or more front lights are integrated into the bicycle.

Optionally, at least one of the one or more front lights is integrated into the handlebar portion.

Optionally, the bicycle further comprises one or more rear lights wherein the one or more rear lights are integrated into the bicycle.

Optionally, at least one of the one or more rear lights is integrated into the frame portion.

Optionally, the bicycle further comprises one or more integrated light projectors.

Optionally, at least one of the one or more integrated light projectors are integrated into the handlebar portion.

Lack of visibility can cause a large number of bicycle collisions every year, especially in poorly lit areas. Many car drivers fail to see a cyclist while they are driving, sometimes because the cyclist is in a location that is not visible in their mirrors (termed the 'blind spot') or because of the lack of luminescence that the cyclist is generating while travelling at night. In many areas where cycling is popular the roads are not adequately lit, and in at least some countries it is a legal requirement for lights to be visible on the front and rear of any bicycle being ridden at night. Some of the lights used by cyclists are however insufficiently bright, and so fail to adequately warn approaching traffic of the cyclist's presence, or fail to illuminate the road ahead sufficiently (for example to avoid potholes or other obstructions). The typical lights used by cyclists are detachable, so they can be lost or forgotten when removed between uses or stolen from a parked bicycle if left on the bicycle.

In some embodiments, integrated lights and/or light projectors are provided and cannot be easily removed from the bicycle, and these can provide lighting to illuminate the road ahead and/or also make other road users aware of the cyclist's presence.

Integrated light projectors are provided to illuminate a portion of the ground surface upon which the bicycle is being ridden. The ground surface would typically be a road or cycle path. The integrated light projectors may serve to illuminate the surface of the road to show potential pitfalls and obstructions to the user in the region ahead of the bicycle. The primary function of the integrated light projectors, however, is to make other road users aware of the position of the bicycle. If the bicycle is approaching a car from behind, then projections on the road may be visible to the driver of the car before the bicycle itself. Therefore, the driver can take care not to risk injury to the cyclist based on seeing the light projections on the road.

By integrating the one or more light projectors to the handlebars, on the periphery of the bicycle, the projectors may be more easily accessed for the purposes of repair or replacement. Positioning the projectors on the handlebars further allows the projections to be generated on either side and in front of the bicycle without a body part of the user blocking the light unintentionally.

Optionally, the bicycle further comprises one or more batteries housed within the bicycle.

Optionally, at least the one or more indicator lights are powered using the battery.

Optionally, at least one of the one or more batteries is removable.

Depending on the embodiment, a battery can be provided to power the integrated indicator lights and/or the integrated front or rear lights and/or the integrated light projectors. By providing one or more batteries, also termed a central or integrated battery or set of batteries, as a power source for any or all of the above mentioned electrical components in at least some embodiments, smaller individual power sources for each component are not required. Having a number of small batteries for each component means it can be complicated to replace and maintain each of these batteries separately, and may result in one of the lights on the bicycle temporarily being without power until a replacement battery is found for that component. Every light not powered can contribute to a lower overall safety of the user of the bicycle. A single battery can be more easily maintained and recharged and is able to power all of the electronics on the bicycle (both integrated and affixed, depending on the configuration of the embodiment in question). If one or more of the batteries are removable then battery replacement, for example if the battery power reserves are low, may be more easily performed by exchanging the depleted battery for one that is charged or more fully charged. The removal of a battery further allows for easier battery access for recharging the battery externally.

Optionally, the bicycle further comprises a dynamo coupled to a set of pedals wherein at least one of the one or more batteries is configured to be recharged through the dynamo generating electrical energy from the pedalling action of a rider using the set of pedals.

During use, a significant amount of power can be generated through the pedalling action of a user. This power is conventionally primarily directed towards propelling the bicycle forwards. However, through the use of a dynamo or similar electrical generator, power generated through the pedalling action of a user can be used to recharge the central battery. If the battery power reserves are low, then the battery can be recharged during use of the bicycle, so that a user is not without battery power even when a replacement battery or charging source is unavailable.

Optionally, at least one of the one or more rear lights changes brightness according to a degree of braking action of the bicycle.

Optionally, the degree of braking action is determined from the use of one or more brake levers.

Increased brightness of a rear light has come to be associated with a braking action of a user of that vehicle. Brake lights, which can sometimes be additional rear headlights, are mandatory on all cars. If the light becomes brighter, or the additional rear light is switched on, then other road users know to keep their distance as that vehicle is likely to be braking. If the rear light on a bicycle performs a similar action on receiving an input that braking is occurring, for example changing from a flashing light to a solid light or for example increasing brightness, then other road users will similarly be aware of the changing speed or direction of the bicycle and will respond accordingly. Brake lever switches and sensors are both conventional methods of braking and so will be easy to use for a cyclist.

Optionally, the brightness of the one or more front and/or rear lights is responsive to ambient lighting conditions.

Lights operating at full power or brightness are not always required. On a bright, clear day, front and rear lights will not greatly contribute to the visibility of a cyclist or the visibility of that cyclist to other road users. It would therefore be wasteful to power the lights at full brightness, and would unnecessarily deplete the battery power reserves. However, on a particularly overcast, foggy day or at night, higher power bicycle lights will be necessary to provide the maximum levels of safety to the cyclist. If the bicycle has not moved in several hours, the user is likely to have dismounted and stored the bicycle in a shed, garage or other repository. It would therefore be unnecessary for the bicycle lights to remain on if the bicycle was not being used. If the lights are responsive to changes in such ambient conditions, for example through the use of a light-sensitive sensor, the battery powering each of the lights will last longer as power will not be wasted providing illumination where it is not required.

Optionally, the integrated front and rear lights switch off or change brightness according to the movement of the bicycle.

When a user has finished cycling, illumination of the front and rear lights is no longer necessary. Therefore, in order to avoid depleting the battery power reserves, a sensor can be provided in relation to monitoring the movement of the bicycle. After a short absence of movement, the lights can be dimmed to conserve power. If the bicycle begins moving again, the lights can be restored to their previous brightness. Following a sustained absence of movement, for example if the bicycle has been locked away or placed in storage, then the integrated front and rear lights can be turned off. Once the bicycle is retrieved from storage or is unlocked, and starts moving, the integrated front and rear lights can resume their operations as normal.

Optionally, the one or more front and/or rear lights comprise a strip of light emitting diodes (LEDs) and/or organic light emitting diodes (OLEDs).

OLEDs and LEDs are power efficient alternatives to the filament bulb or halogen bulbs. A strip of OLEDs or LEDs can provide a bright light source, and last for a significant amount of time when powered by a battery provided on or within a bicycle before recharging of the battery is required when compared with filament or halogen bulbs. OLEDs and LEDs are also relatively inexpensive and easily replaced if broken.

Optionally, the angle of attack of the one or more front and/or rear lights is adjustable.

Optionally, the brightness of the one or more front and/or rear lights is adjustable.

Different ambient conditions while cycling will affect the power and visibility requirements of the front light. In a built up, urban environment with adequate street lighting, then the front and/or rear light may be angled away from the faces of other road users so as to avoid glare or dimmed to save battery. However, in inclement weather or in less well-lit areas, the cyclist may be safer if they angled the front and/or rear light so as to see a greater distance ahead of them or behind them, and increased the brightness of the front and/or rear light as required.

Optionally, the one or more indicator lights are positioned at substantially the opposing ends of the handlebar portion.

For indicator lights to provide a substantially high level of safety, they must be visible to other road users. Conventionally, indicator lights are placed on either side of a vehicle. By placing the indicator lights on the handlebars of the bicycle, either at the very ends or towards the ends of the handlebars, the lights should be visible to other road users while at the same time being clear to other road users in specifying the direction in which the user is indicating.

Optionally, the one or more integrated light projectors comprise one or more lasers.

Optionally, the one or more integrated light projectors are operable to generate one or more light projections on the surface on which the bicycle is being used.

Optionally, at least a portion of the light projections is generated on the surface ahead of the bicycle.

Optionally, the one or more integrated light projectors generate light projections comprising two substantially parallel lines on the surface on which the bicycle is being used.

Rays of laser light generated in a process known as collimation (via the stimulated emission of electromagnetic radiation) can stay narrow over great distances. If a specific projection is to be displayed on the road, a laser can substantially maintain that projection at a range of distances without becoming significantly blurred. The sharp lines of a laser projection can show up clearly on a road surface, increasing safety. By providing a projection on the surface ahead of the bicycle, another road user may notice the projection before they can see the bicycle itself, for example thereby avoiding inadvertently driving into the path of a bicycle. Two substantially parallel lines help define a path or lane which a cyclist is occupying, thereby avoiding other road users from straying dangerously close to the bicycle while it is in use. It will be appreciated that other substantially collimated or laser-like light sources can be used instead of a laser.

Optionally, the one or more light projections change shape and/or brightness during the use of the integrated indicator lights.

The light projections may be adapted so that the simultaneous use of the integrated light projectors and the integrated indicator lights alters the light projections to increase the awareness of other road users of the intended direction of the bicycle. Such an adaptation may include causing the projection on one side of the bicycle to oscillate in time with an oscillating indicator light on that same side, thereby allowing other road users to identify the intended direction of the bicycle at a longer range or at angles from which the integrated indicator lights alone may not be visible. Alternatively, an arrow may be projected, or the straight lines can become a curved or set of curved lines illustrating a figurative, predicted or actual path of the bicycle.

Optionally, the bicycle further comprises electrical wiring configured to connect a power source to any electrical components, wherein the electrical wiring is housed substantially internally within a rigid frame of the bicycle.

Optionally, the power source can be the aforementioned one or more batteries.

Optionally, the electrical components comprise any or all of: the one or more indicator lights; the one or more front lights; the one or more rear lights; the one or more integrated light projectors; or the dynamo.

Optionally, the bicycle further comprises a brake mechanism wherein the brake mechanism is housed substantially internally within a rigid frame of the bicycle.

To equip a bicycle with one or more electrical components is likely to require the use of one or more wires. Conventionally these wires are placed externally to the frame of the bicycle, rendering them vulnerable to inclement weather or being torn out of their respective devices accidentally during the use of the bicycle or deliberately. By housing a substantial portion of any wiring required to provide said components with power internally within the rigid frame of the bicycle, or integrating such wiring fully within the bicycle frame, the wires can be more protected from many different forms of damage. The bicycle safety devices are therefore likely to remain operative for longer, and so the bicycle itself need less maintenance and repair.

Conventional bicycle brakes make use of a cable linking the handlebars to the brakes themselves, located adjacent the bicycle wheels. As with electrical wiring, external placement of these cables can render them vulnerable to inclement weather or being torn out of their sockets accidentally during the use of the bicycle. Housing the cables within the rigid frame of the bicycle provides many of the same benefits as the housing of the electrical wires.

Optionally, one or more peripheral section of the handlebar portion is removable.

Optionally, the handlebar portion substantially houses one or more batteries.

Optionally, the one or more batteries are replaceable.

To minimise wiring required and potential complications associated with same, it is often advantageous to place a power source as close as possible to the device being powered. By providing the bicycle with a removable section of handlebar, a power source may be placed therein, adjacent the integrated front light, integrated light projectors and integrated indicator lights. Removing the section of handlebar also allows for convenient access to electronic components if repair or replacement is required. A replaceable power source allows for a drained or damaged power source to be instantly replaced so the bicycle may be used at its full capacity immediately, rather than having to wait for a battery to be recharged or a complete disassembly performed.

Optionally, the bicycle further comprises an electronic horn.

Optionally, the electronic horn is integrated into the bicycle.

Optionally, the electronic horn is integrated into the handlebar portion.

Optionally, the electronic horn is controlled using any or all of: a button; a lever or a switch; wherein the button and/or lever and/or switch are mounted on or integrated into the handlebar portion.

A loud horn is a legal requirement on many roads for motor vehicles. The horn serves to make other road users aware of the vehicle's presence, especially if they may not be visible. An electronic bicycle horn, triggered easily using a switch, button or lever, may generate the same effect. Bicycles are often less visible than larger vehicles, especially when cornering or in inclement weather, and a horn will aid awareness of the bicycle.

Optionally, the bicycle further comprises an additional power source.

Optionally, the additional power source is a solar power generating device attached to and/or integrated into the bicycle.

Optionally, the solar power generating device is a solar film and/or printable solar cell that is attached and/or affixed to portions of a rigid frame of the bicycle.

To maximise the safety of the bicycle, it is very important that as many of the electronic devices as possible coupled to the bicycle are functional. If there is a problem or breakage associated with the only battery, or the one or more integrated batteries, run out of charge, then all of the electronic devices may fail simultaneously. To help prevent such an occurrence, a backup or distributed power source may be provided. If a problem with the one (or the primary) battery occurs then a second (or backup) power source may be used to power any associated electronic devices and so the bicycle may still be used as safely as possible. Alternatively, an additional power source can be used to charge the one or more batteries. The additional power source can be a solar-power generating device such as a solar PV panel or solar film that is incorporated or affixed to portions of the bicycle.

Optionally, the bicycle further comprises a mount for a mobile device.

It is often desirable to have a mobile device visible and secured during cycling, for example for navigation. By providing a mount for a mobile device, the mobile device can easily and securely be fixed to the bicycle.

Optionally, the bicycle further comprises a charging port for a mobile device. Optionally, the charging port is in the form of a Universal Serial Bus (USB) charging port.

A large number of mobile devices are operable to be charged through a USB charging port. It is therefore useful if they can be recharged during the use of the bicycle, as the user can arrive at their destination having at least partially recharged the battery of their device.

Optionally, one or more electronic devices coupled to the bicycle are connected to a data network; preferably where the data network is provided by data cabling integrated into the bicycle or wirelessly. Optionally, information can be shared across any electronic devices connected to the data network.

In this embodiment, various elements of the electronic devices coupled to the bicycle can communicate with each other. Such communication may provide enhanced safety to the user, for example if the integrated front and rear lights detect low light levels then the brightness of a visible mobile device can be adjusted accordingly so as not to dazzle the user.

Optionally, the data network is operable to be connected to the Internet. Optionally, data can be transferred between the Internet and the data network.

Developers of electronic devices commonly update the software for said devices, often providing more user-friendly access, greater functionality, and fixing known glitches and operating system errors. Software updates are usually therefore very useful, and the latest version is generally desired in any given device. If the network, and therefore indirectly all the individual devices, are able to connect to the Internet, then software updates can be more easily provided to each device. The devices do not need to be manually and individually updated. The software updates may be provided through an app which has been downloaded onto one or more devices or onto one or more connected devices. The software may also be provided through a cloud computing system.

Optionally, any electronic devices coupled to the bicycle are activated and deactivated through the use of one or more controls integrated into the handlebars.

Optionally, the one or more controls comprise one or more buttons and/or switches and/or levers.

To encourage safe use of the bicycle, it is important that the controls for the safety features are easy to use. Complicated or time consuming controls will distract the user from actually cycling, and may lead to a collision or other accident. The use of a single button activating, say, the integrated front light, will encourage more users of the bicycle to activate that light than if it was a time consuming or difficult process.

Optionally, the one or more indicators are controlled using a circuit breaker.

Optionally, the bicycle further comprises a power routing switch that supplies regulated power to electrical components mounted on and/or integrated into the bicycle.

Power from the integrated one or more batteries can be directed through intelligent routing circuitry to the integrated devices. The indicators can be configured to switch on and off using circuit breakers. The power routing switch can provide power to the various electrical components integrated or mounted to the bicycle.

Optionally, at least one of the one or more indicators are provided on at least one front spoke of the bicycle.

Optionally, at least one of the one or more indicators are provided on the outward facing surface of at least one front spoke of the bicycle.

Providing indicators on the spoke can mean that it is harder to damage the indicators, as the spokes are unlikely to suffer damage or be subject to damaging impacts with other objects or the ground during use of the bicycle.

Optionally, at least one of the one or more indicators are provided on a portion of the frame of the bicycle.

Optionally, the at least one of the one or more indicators are positioned substantially centrally on the frame of the bicycle.

Providing indicators on the frame can mean that it is harder to damage the indicators, as the frame is unlikely to suffer damage or be subject to damaging impacts with other objects or the ground during use of the bicycle when compared with other parts of the bicycle.

Optionally, the bicycle further comprises sensors integrated into at least one handle of the handlebar portion.

Optionally, the sensors include any of: pulse sensors; or heart rate sensors.

Optionally, the bicycle further comprises a sensor to determine the speed of the bicycle.

Optionally, the bicycle further comprises an integrated digital display in the handlebar portion, the integrated digital display configured to display any or all of: the speed of the bicycle; vitals of the rider; or the remaining power in the one or more batteries.

By providing various sensors and an integrated digital display, the rider can be shown various useful data during use of the bicycle. For example, speed data can be displayed using data generated by a speed sensor. Further, for example, a pulse or heart rate sensor in the handlebars can provide vitals data for display. Also, for example, the remaining power in the one or more batteries in the bicycle can be displayed to warn the user if charging is required or if the dynamo needs to be activated.

Optionally, at least one of the one or more indicator lights is provided in a seat portion of the bicycle, preferably in the rear portion of the seat portion and/or in the seat stay.

Providing indicators in the seat of the bicycle can increase the ability of other road users behind the bicycle to see that the rider is indicating.

Optionally, the bicycle further comprises a front camera and/or a back camera integrated into the bicycle.

Optionally, the front camera is integrated into the handlebar portion and the back camera is integrated into the frame portion.

Providing front and/or rear cameras allows the rider to record video footage or take still images of their journey for future reference. The cameras can store video or images in on-board memory or on to connected devices, depending on embodiment.

According to a second aspect, there is provided a set of handlebars for a bicycle, comprising one or more controls operable to control one or more integrated electrical components on the bicycle.

Optionally, the one or more controls are integrated into the handlebars. Optionally, the one or more controls comprise one or more buttons and/or switches and/or levers. Optionally, the one or more controls are operable to control one or more of: integrated indicator lights; integrated front and rear lights; integrated light projectors; or an integrated horn.

To encourage safe use of the bicycle, it is important that the controls for the safety features are easy to use. Complicated or time consuming controls will distract the user from actually cycling, and may lead to a collision or other accident. The handlebars are usually readily available to use during operation, as they are conventionally adjacent the hands of the user. Therefore controls on the handlebars allow for the safety features integrated into the bicycle to be used without endangering the safety or requiring much additional effort on behalf of the user.

According to a third aspect, there is provided an integrated rear light, operable to change brightness according to a braking action of a user.

When a bicycle is in the process of braking, it is conventionally not obvious to a vehicle travelling behind. There is therefore a risk of collision if the bicycle brakes sharply, and therefore decelerates rapidly, and a vehicle following behind is not expecting such a manoeuvre. The risk is mitigated if the vehicle behind can be made aware of the deceleration, for example if the light were to become brighter while the brakes were being applied.

Optionally, the braking action of the user is in the form of a brake lever and/or a switch and/or a sensor.

To maximise the safety of the user, the braking action can be provided in a conventional and easy-to-use manner. The user will therefore find it straightforward to operate the braking system.

According to a further aspect, there is provided a machine-readable map, or machine-readable instructions, configured to enable a 3D printer (or any printer or manufacturing device/system) to manufacture the object of any preceding claim.

The object or system may be commonly manufactured using a mould-injection process comprising one or more plastics, such as polyurethane, alongside a heat transfer sticker.

BRIEF DESCRIPTION OF DRAWINGS

Embodiments of the present invention will now be described, by way of example only and with reference to the accompanying drawings having like-reference numerals, in which.

SPECIFIC DESCRIPTION

Figure 1:
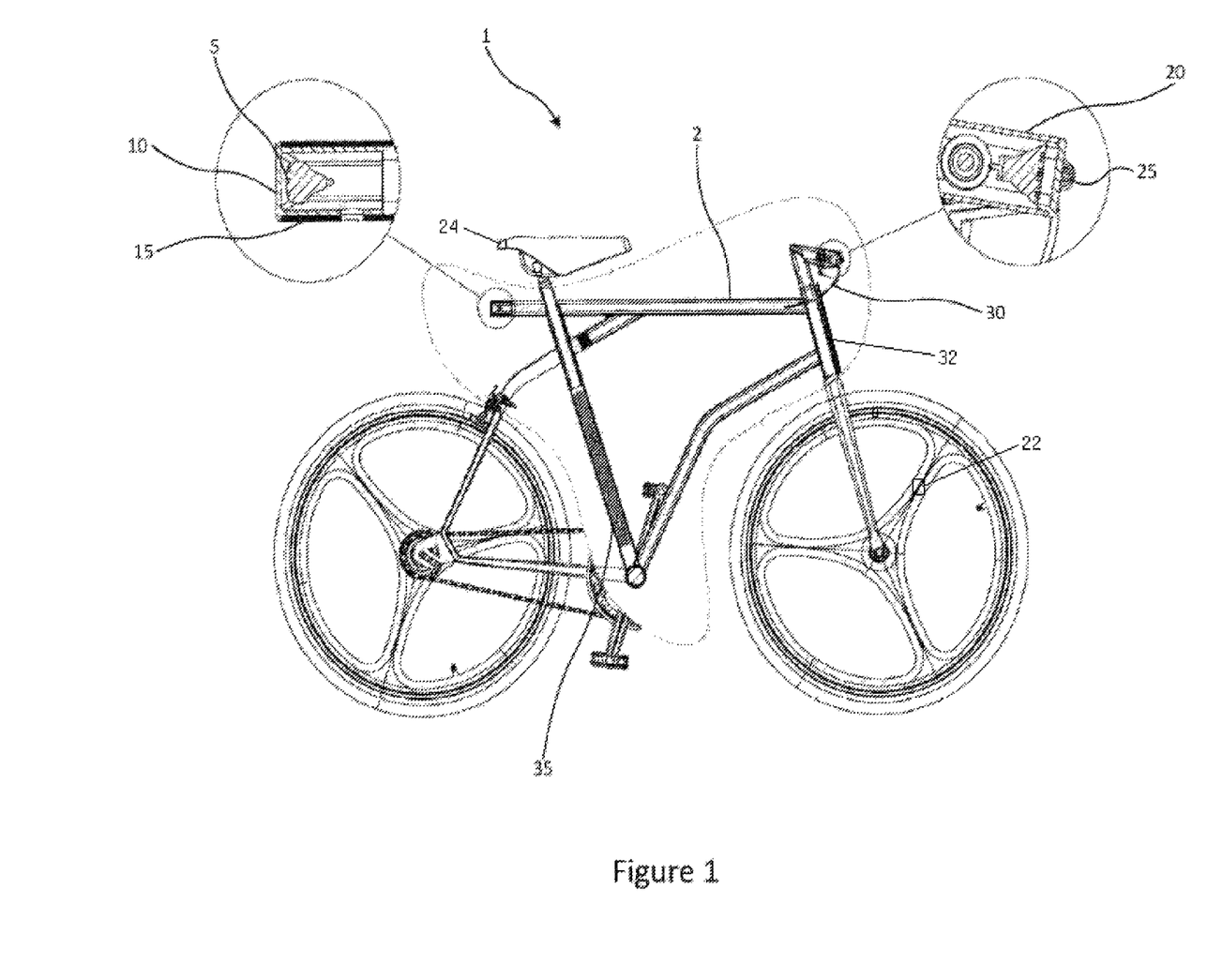
FIG. 1 illustrates a profile view of the assembled bicycle.

Referring to FIG. 1, a first embodiment will now be described in detail as follows.

FIG. 1 shows a bicycle 1, operable to be used as a conventional bicycle, including road, outdoor, off-road and racing uses. The bicycle 1 comprises a rigid frame 2. The frame 2 is operable to house one or more wires or cables connecting various components integrated onto the bicycle. Such components may include an integrated rear light 5, which is inserted inside a section of frame 15. The wire connecting the light to a power source will be housed inside the section of frame 15. A cover 10 for the rear light 5 protects the light from water and detritus which may be thrown up by the rear wheel of the bicycle 1 during normal use, or may be present under inclement weather conditions. The cover 10 may also act to diffuse the light emitted from the rear light 5, so as to produce a more aesthetically pleasing glow, or tint the colour of the light to the red colour required by law in many countries.

FIG. 1 further illustrates an integrated front light 25, inserted inside a section of frame 20. In this example the front light 25 stands proud from the end of the section of frame 20, without a cover, so as to maximise the brightness of the light emitted from the front of the bicycle 1. However in another embodiment a cover may be fitted to the front light 25. As with conventional bicycles, a brake cable 30 operates to link the brake handle to the brakes on the bicycle 1 wheels. In one embodiment of this invention, the brake cable 30 is substantially enclosed within the frame 2. All of the electrical components in the bicycle 1 may be powered from a single, central power source 35 housed within the frame 2. The wiring required to power said components is housed substantially within the frame 2, enclosing the wiring therein. The brake cables 30 may also be housed substantially within the frame 2. In an alternative embodiment the wiring and cables 30 are housed externally to the frame 2.

Figure 2:
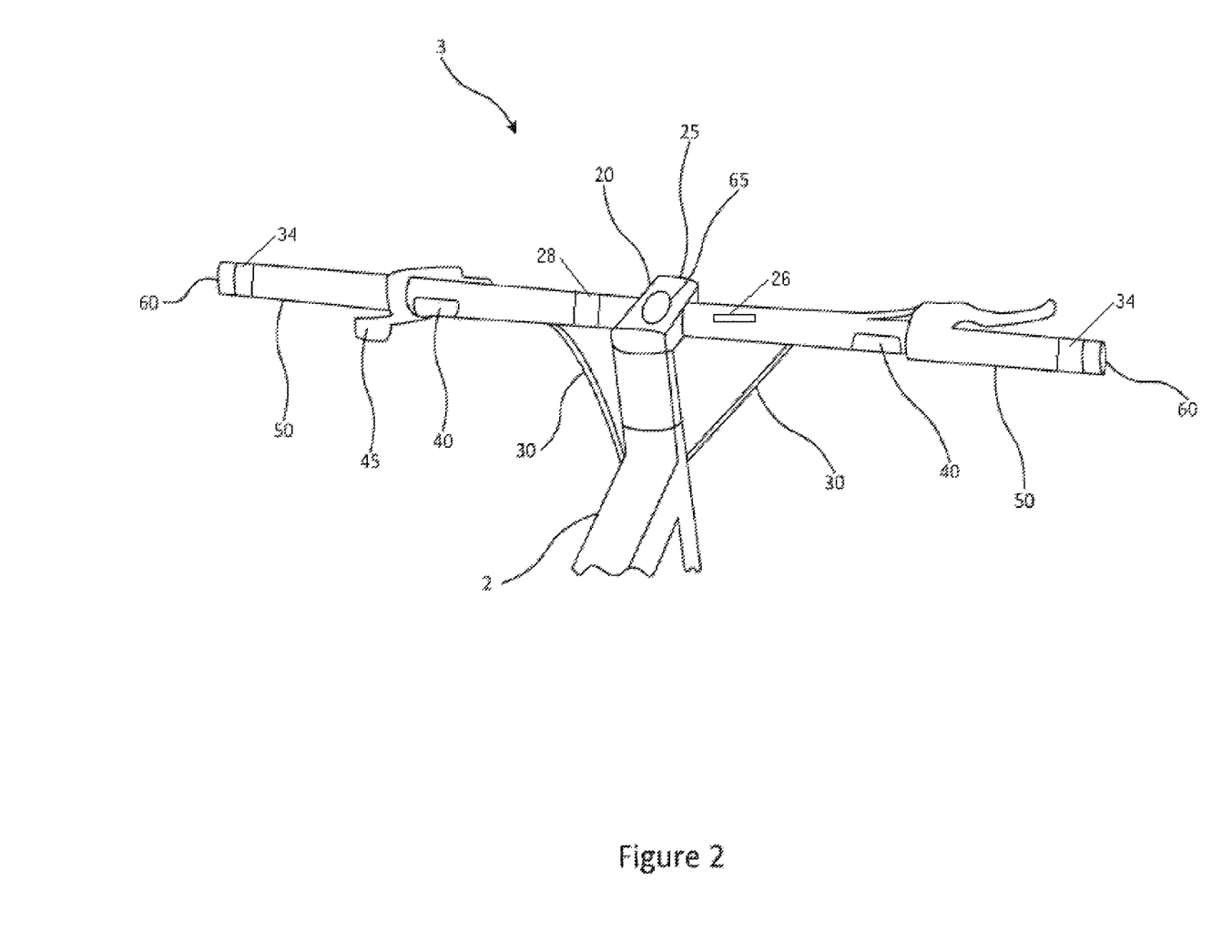
FIG. 2 illustrates the handlebar arrangement.

FIG. 2 illustrates a close-up view of the handlebar arrangement 3 of the bicycle 1. The handlebar arrangement 3 is pivotally coupled to the frame 2, to allow for steering of the bicycle 1 while in use. The section of frame 20 is positioned substantially centrally on longitudinal axis of the handlebar arrangement 3, and is operable to house the integrated front light 25. For ease of use, the bicycle 1 may comprise a gearing system, operated by a user adjusting a lever 45 positioned on the handlebar arrangement 3. The handlebar arrangement 3 also comprises two handles 50, where a user may place their hands and grip the handlebar arrangement 3 during use. The handles 50 may comprise a tactile covering so as to allow the user to grip the handles 50 firmly even under adverse conditions. Adjacent the handles 50 are indictor light buttons 40. The indicator lights may be operated using the button 40, located adjacent the handle 50. The indicator lights serve to indicate to other road users the direction in which the user is planning to turn, thereby helping to avoid collisions. The indicator lights are connected to the central power source 35, and draw the electricity required for operation from same.

Light projectors 60 are also coupled to the handlebar arrangement 3. Each projector 60 illuminates a section of the road adjacent and/or ahead of the bicycle 1, thereby magnifying a user's presence on a road. The light projectors are powered by the central power source 35. In an alternative embodiment the handles 50 may be removable from the handlebar arrangement 3. A separate battery or alternative power source, such as solar panels 32 disposed on the frame, may then be used to power the light projectors 60. The power source and connected wiring to the light projectors are then housed substantially within the handles 50. The handlebar arrangement may also comprise an electronic horn 28, capable of emitting a sufficiently loud noise so as the make other road users aware of the presence of the bicycle 1 user. The handlebar can further include a charging port 26, such as a USB port. Indicator lights 34, that illuminate both forward and rearward, may also be disposed on the handlebar. Lights may also be present as seat lighting 24 and spoke lighting 22.

In order to activate the various electronic safety devices, a switch 65 is provided on the handlebar arrangement 3. The switch 65 is operable to vary the power sent to the electronic safety devices between 0 Watts when switched off, and a maximum value when the electronic safety devices are required. The switch may be formed by a single unit, the unit comprising one or more buttons or levers to control the individual electronic devices coupled to the bicycle.

Figure 3:
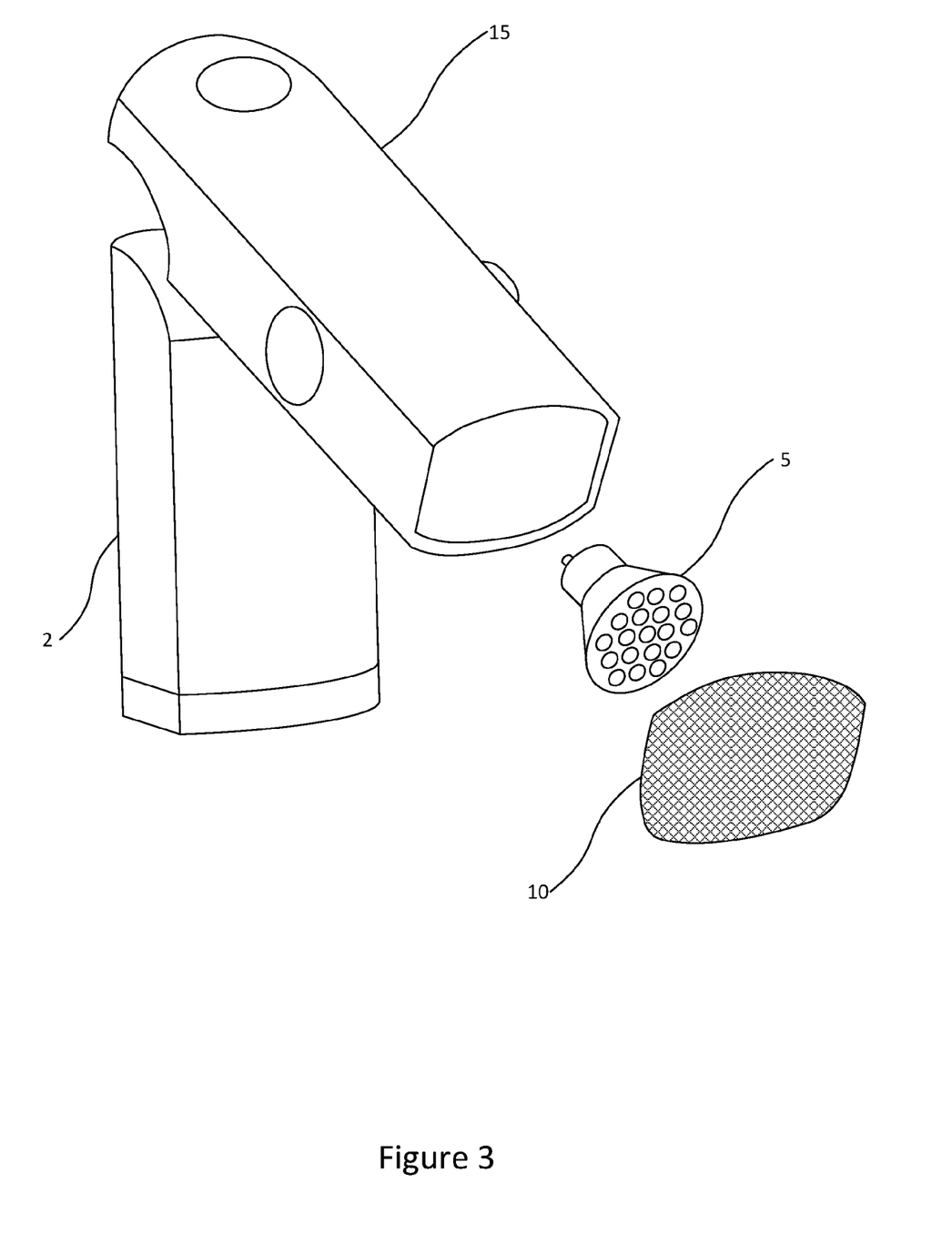
FIG. 3 illustrates the integrated rear light.

FIG. 3 illustrates an exploded view of the integrated rear light assembly. The section of frame 15 is coupled to the bicycle frame 2. The section of frame 15 is hollow, and is operable to house the rear light 5 along with the associated wiring required for powering the rear light 5. The cover then is sealed over the rear light 5 for the reasons outlined above.

Many different methods of manufacture may be used to produce any of the components mentioned in relation to this apparatus. For example, components of one or more embodiments described herein may be manufactured by way of '3D printing' whereby a three-dimensional model of one of the various options for the hand-held objects are supplied, in machine-readable form, to a '3D printer' adapted to manufacture said one or more components. This may be by additive means such as extrusion deposition, Electron Beam Freeform Fabrication (EBF), granular materials binding, lamination, photopolymerization, or stereolithography or a combination. The machine-readable model comprises a spatial map of the object or pattern to be printed, typically in the form of a Cartesian coordinate system defining the object's or pattern's surfaces. This spatial map may comprise a computer file which may be provided in any one of a number of file conventions. One example of a file convention is a STL (STereoLithography) file which may be in the form of ASCII (American Standard Code for Information Interchange) or binary and specifies areas by way of triangulated surfaces with defined normals and vertices.

An alternative file format is AMF (Additive Manufacturing File) which provides the facility to specify the material and texture of each surface as well as allowing for curved triangulated surfaces. The mapping of the object may then be converted into instructions to be executed by 3D printer according to the printing method being used. This may comprise splitting the model into slices (for example, each slice corresponding to an x-y plane, with successive layers building the z dimension) and encoding each slice into a series of instructions. The instructions sent to the 3D printer may comprise Numerical Control (NC) or Computer NC (CNC) instructions, preferably in the form of G-code (also called RS-274), which comprises a series of instructions regarding how the 3D printer should act. The instructions vary depending on the type of 3D printer being used, but in the example of a moving printhead the instructions include: how the printhead should move, when/where to deposit material, the type of material to be deposited, and the flow rate of the deposited material.

Any part of an apparatus as described herein may be embodied in one such machine-readable model, for example a machine-readable map or instructions, for example to enable a physical representation of said part of apparatus to be produced by 3D printing. This may be in the form of a software code mapping of one or more components and/or instructions to be supplied to a 3D printer (for example numerical code).

Any system feature as described herein may also be provided as a method feature, and vice versa. As used herein, means plus function features may be expressed alternatively in terms of their corresponding structure.

Any feature in one aspect of the invention may be applied to other aspects of the invention, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently. Specifically, the electronic components integrated into the bicycle may be supplied and/or replaced separately from one another. The electronic components may further be retro-fitted onto a bicycle, or supplied externally before being coupled to a bicycle.

The invention claimed is:

1. A bicycle comprising:
one or more indicator lights;
a handlebar portion and a frame portion;
one or more integrated front lights, the integrated front lights integrated into the frame portion of the bicycle and providing illumination in front of the bicycle;
one or more integrated rear lights, the integrated rear lights integrated into the frame portion of the bicycle and providing illumination to a rear of the bicycle;
wherein the one or more indicator lights are integrated into the bicycle and operable to illuminate at least one of in front of the bicycle and to the rear of the bicycle; and
one or more integrated light projectors, wherein the one or more integrated light projectors configured to illuminate a section of the road adjacent or ahead of the bicycle, the one or more integrated light projectors further comprise one or more lasers operable to generate one or more light projections on the surface on which the bicycle is being used, the one or more light projections illuminating lane lines on the surface adjacent each side of the bicycle.

2. The bicycle according to claim 1, wherein a plurality of lights integrated into the handlebar portion are positioned at substantially opposing ends of the handlebar portion.

3. The bicycle according to claim 1, wherein the one or more integrated front lights are integrated into the handlebar portion, and wherein the one or more front integrated lights comprise at least one of a strip of light emitting diodes (LEDs) and organic light emitting diodes (OLEDs).

4. The bicycle according to claim 3, wherein the brightness of the one or more front and/or rear integrated lights is responsive to ambient lighting conditions, wherein the one or more front integrated lights switch off or change brightness according to the movement of the bicycle.

5. A bicycle according to claim 4, wherein the brightness of at least one of the one or more front integrated lights and the one or more rear integrated lights is responsive to ambient lighting conditions, wherein the one or more front integrated lights switch off or change brightness according to the movement of the bicycle, wherein at least one of the one or more rear integrated lights changes brightness according to a degree of braking action of the bicycle, the breaking action being determined from the use of one or more brake levers.

6. The bicycle according to claim 1, wherein the one or more rear integrated lights are integrated into the frame portion, and wherein the one or more rear lights comprise at least one of a strip of light emitting diodes (LEDs) and organic light emitting diodes (OLEDs); an adjustable angle of attack; and/or an adjustable level of brightness.

7. The bicycle according to claim 1, wherein the one or more integrated light projectors are integrated into the handlebar portion and are operable to change shape or brightness during the use of the integrated indicator lights.

8. The bicycle according to claim 1, further comprising one or more batteries housed within the bicycle, optionally wherein the one or more batteries are removable, and wherein at least one of the one or more batteries is configured to be recharged through a dynamo generating electrical energy from a pedalling action of a rider using a set of pedals coupled to the dynamo.

9. The bicycle according to claim 1, further comprising electrical wiring configured to connect a power source, wherein the power source comprises one or more batteries, to any electrical components, wherein the electrical wiring is housed substantially internally within a rigid frame of the bicycle.

10. The bicycle according to claim 9, wherein the electrical components comprise at least one of the one or more indicator lights; the one or more front integrated lights; the one or more rear integrated lights; the one or more integrated light projectors; and a dynamo.

11. The bicycle according to claim 1, wherein one or more peripheral sections of the handlebar portion are removable.

12. The bicycle according to claim 1, wherein the handlebar portion substantially houses one or more batteries, optionally wherein the one or more batteries are replaceable.

13. The bicycle according to claim 1, further comprising an electronic horn wherein the electrical horn is integrated into the bicycle.

14. The bicycle according to claim 1, further comprising an additional power source, wherein the additional power source comprises a solar power generating device attached to or integrated into the bicycle.

15. The bicycle according to claim 1, further comprising a charging port for a mobile device.

16. The bicycle according to claim 1, wherein at least one of the one or more indicator lights are provided on at least one front spoke of the bicycle.

17. The bicycle according to claim 1, wherein at least one of the one or more indicator lights is provided in a seat portion of the bicycle.

\* \* \* \* \*